United States Patent [19]
LaCroix

[11] Patent Number: 5,909,748
[45] Date of Patent: Jun. 8, 1999

[54] PRESSURE RELIEF VALVE

[76] Inventor: Barry LaCroix, 866 Main Street East, Hamilton, ON, Canada, L8M 1L9

[21] Appl. No.: 09/084,185

[22] Filed: May 26, 1998

[51] Int. Cl.[6] .................................................. F16K 15/00
[52] U.S. Cl. .................. 137/527; 137/527.6; 137/516.29
[58] Field of Search ................................ 137/527, 527.6, 137/516.29, 516.27, 516.25; 281/337, 303

[56] References Cited

U.S. PATENT DOCUMENTS

| | | | |
|---|---|---|---|
| 3,438,391 | 4/1969 | Yocum | 137/516.29 |
| 4,595,032 | 6/1986 | Banks | 137/527 |
| 5,205,125 | 4/1993 | Potter | 137/527 |

*Primary Examiner*—Denise L. Ferensic
*Assistant Examiner*—Joanne Y. Kim

[57] ABSTRACT

The present invention, a pressure relief valve includes a valve body having, a valve seat and a flap valve pivotally mounted on said valve body, wherein said flap valve sealably co-operates with said valve seat in a closed position thereby sealing off said pressure relief valve, wherein the valve flap pivots about a pivot axis between a closed position and fully opened position. The pressure relief valve also includes a coil spring operably connected to said flap valve for applying a continuously increasing spring force as said valve pivots from the closed position to the fully opened position. The pressure relief valve further includes a pivot arm rigidly connected to said flap valve at one end and pivotally connected to a link arm at the other end, wherein said link arm is operably connected to said springs, such that the biasing force of the springs is communicated to the flap vale through said link arm and said pivot arm. Wherein, the linkage is adapted to enable the valve closing force to be preselected according the position of the flap valve, such that the valve closing force is a function of valve position.

18 Claims, 9 Drawing Sheets

PRESSURE RELIEF VALVE

FIELD OF THE INVENTION

This invention relates to a pressure relief valve for vessels containing pressurized fluids.

BACKGROUND OF THE INVENTION

The hazards presented in the event of a fire by large vessels containing pressurized fluids, particularly flammable fluids such as railcars for the conveyance of liquefied petroleum gases, are well known. The pressure within such a vessel when subject to external heat such as that due to an external fire, will rise, whilst the temperature of walls of the vessels, particularly in areas not in contact with the liquid contents of the vessels, may rise to a level at which their structural strength is sufficiently reduced to result in catastrophic failure to sustain the increased pressure within the vessel. Since such fires commonly arise following an accident such as a derailment, the orientation of the vessel when required to sustain such an abnormal position is not predictable.

The desirability of fitting a vessel with an efficient pressure relief valve is widely recognized and the performance requirements for such a valve are onerous and must be capable of providing an adequate rate of fluid flow under wide range of emergency conditions. It must retain a reclosure capability such as to restrain unnecessary continuation of venting of the contents of the vessel when its internal pressure has fallen to an acceptable level even after exposure to extreme temperatures. According to the circumstances and the orientation of the vessel during venting, the valve may be required to pass gas, liquid or a mixture of gas and liquid. The rate of volume discharge of gas will be much higher than that for liquid or a liquid/gas mixtures. The valve must be gas and fluid tight under non-emergency conditions as well.

Conventional pressure relief valves for this type of application have usually been of the poppet type, and rating for a desired vapour at a discharge rate. The configuration of a poppet valve is such as inherently to limit the valve opening which can be achieved with a valve body of a given size, and the difference between opening and closing pressures is fixed by the design of the valve.

The requirement for safety relief devices to resist a predetermined set pressure and to fully flow at only a slight increase in pressure, requires that the springs be sufficiently rigid to attain the set pressure and as well have a low enough spring rate to allow the valve to fully open during a necessity for full flow. Traditionally this requirement demands relatively large springs, which are aligned with the stem of the valve creating excessive profiles and obstructions in the fluid flow through the valve.

Some attempts have been made to solve this problem in particular U.S. Pat. No. 5,411,056 to Alberto Solaroli entitled Pressure Relief Valve and U.S. Pat. No. 4,856,547 to Alberto Solaroli again entitled Pressure Relief Valve has attempted to provide the necessary valve opening forces without having to resort to extremely large springs . I refer particularly to U.S. Pat. No. 4,856,547 in column 3, lines 15 to 25 where the inventor describes the use of a longitudinal slot 44 shown in FIG. 3 having a distal end within which is retained a sliding boss 46 formed with a groove 48 which engages an end loop 50 of a tension spring 52. As described in this patent, once the internal pressure is great enough to overcome the set force or set pressure, crank arm 42 pivots from the vertical position thereby allowing sliding boss 46 to move down a longitudinal slot 44 in the crank arms distal end, thereby attempting to reduce the spring bias on said valve as the valve opens from a closed position to an open position. This particular arrangement is subject to galling and friction forces on sliding boss 46 in longitudinal slot 44 which may be unpredictable and subject to the lubrication and materials employed.

The present invention allows for a small highly rated spring to supply the set resisting force with any further deflection of the spring providing a constant force or other force profiles as the application requires during opening.

Unlike conventional safety relief valves used in the storage and transportation of bulk fluids using the stem and seat arrangement, the present valve swings away from the flow channel allowing virtually unrestricted flow directly exiting the area that is under excess pressure. The design is such that the circular valve opens away from the seat and from the plane of mounting. Subsequently, extremely high flow rates can be achieved using this design.

Using the presently invented mechanism, the valve can for example operate as though the springs where providing constant force, opening from the set or closed position to a fully open position with little or no increase in restraining force. As the valve is opened by a pressure increase in the containment vessel or line, the component of restraining force can for example become smaller and remains less than the fluids static and dynamic force.

It is the objective of the invention to provide a pressure relief device, that is not constrained by the size of the springs, which directly act as the resisting force against normal operating pressures and events of over pressuring.

SUMMARY OF THE INVENTION

The present invention a pressure relief valve comprises a valve body including a valve seat, a flap valve pivotally mounted on said valve body, said flap valve sealingly co-operating with said valve seat in a closed position sealing off said pressure relief valve, said flap valve pivoting about a pivot axis between said closed position and a fully open position a biasing means operably connected to said flap valve for applying a biasing force as said valve pivots from said closed position to said fully open position; and a linkage means for communicating biasing force from said biasing means to said valve such that the linkage means continuously urges said valve to said closed position, said linkage means communicating a preselected component of said total biasing force onto said valve as a valve closing force, wherein the linkage means is adapted to enable the valve closing force to be preselected according to the position of the flap valve, such that the valve closing force as a function of the valve position can be pre selectively controlled.

Preferably said linkage means comprises a pivot arm having a valve end and a pivot end, said valve end rigidly and integrally connected to said flap valve and extending longitudinally from said pivot axis, wherein said pivot arm pivots about said pivot axis in unison with said valve, and wherein said pivot arm is longitudinally disposed at a preselected angle alpha from a valve plane; and, a link arm having a pivot end and a spring end, said link arm and pivot arm pivotally connected together at said pivot end of each arm, and said link arm pivotally connected to said biasing means at said spring end, wherein said spring end of said link arm is urged linearly along a spring axis by said biasing means, and said link arm pivotally connected to said pivot arm communicates and converts said linear movement of said spring end of said link arm into a pivoting movement of said pivot arm about said pivot axis, wherein only a preselected component of the total bias force is communicated as a valve closing force to said flap valve.

Preferably said biasing means includes a coil spring securely mounted longitudinally along said spring axis in compression between a spring cap at one end and a spring stop at the other spring end, wherein said spring stop and said spring end of said link arm are pivotally connected together for communicating spring forces from said spring to said valve.

Preferably said biasing means further includes a retainer bolt mounted longitudinally along said spring axis which threadably engages a spring guide integrally part of said valve body, such that said coil spring can be pre compressed to provide a preselected set pressure by threadably tightening said retainer bolt thereby compressing said spring between said spring cap and said spring stop, and wherein spring movement is guided linearly along said spring guide which extends longitudinally along said spring axis and part way along the longitudinal length of said spring.

Preferably said pressure relief valve includes at least, two substantially identical pivot arms, link arms and springs, each mounted as described above in symmetrical fashion about said valve, wherein further said springs are operably connected in parallel fashion by said spring stop such that the total biasing force available is the sum of the forces from each spring.

Preferably said valve seat includes inverted V shaped upper surfaces for sealing against a V shaped groove in said valve which is adapted to cooperate and seal with said V shaped upper surfaces of said valve seat, when said V shaped upper surfaces make contact with said V shaped groove.

Preferably said valve includes an inner valve disk and an outer valve disk, with respective planar surfaces lying parallel and abutting each other, such that the inner valve disk defines a inner sealing surface and the outer valve disk defines an outer sealing surface wherein inner and outer sealing surfaces together form said V shaped groove which cooperates and seals against said upper surfaces of said valve seat.

Preferably said valve includes an o-ring disposed between said inner sealing surface and said outer sealing surface at the base of said V shaped groove, such that said upper surfaces of said valve seat contact said o-ring when said valve is in said closed position thereby providing a fluid tight seal.

Preferably the fully open position is attained by pivoting said flap valve 80° from said closed position, and wherein a stop prevents rotation of said valve past 80°.

Preferably said pivot axis location, angle alpha, link arm length, pivot arm length and the location of said spring axis are selected such that said valve closing force remains substantially constant as the valve pivots from said closed position to said fully open position.

Preferably said pivot axis location, angle alpha, link arm length, pivot arm length and the location of said spring axis are selected such that said valve closing force initially increases, to prevent a false opening of the valve, then remains substantially constant for most of the valve rotation, and then decreases as the valve pivots from said closed position to said fully open position respectively.

Preferably said pivot axis location, angle alpha, link arm length, pivot arm length and the location of said spring axis are selected such that said valve closing force remains within ±5% of the valve opening force as the valve pivots from said closed position to said fully open position.

Preferably said pivot axis location, angle alpha, link arm length, pivot arm length and the location of said spring axis are selected such that said valve closing force continuously increases or decreases as said valve pivots from said closed position to said fully open position.

Preferably the pressure relief valve for use with railway tank cars containing pressurized gases or liquids.

Preferably said biasing force applies a continuously increasing force as said valve pivots from said closed position to said fully open position.

BRIEF DESCRIPTION OF THE DRAWINGS

The invention will now be described by way of example only, with references to the following drawings in which.

DETAILED DESCRIPTION OF THE PREFERRED EMBODIMENTS

Definitions

Figure 1:
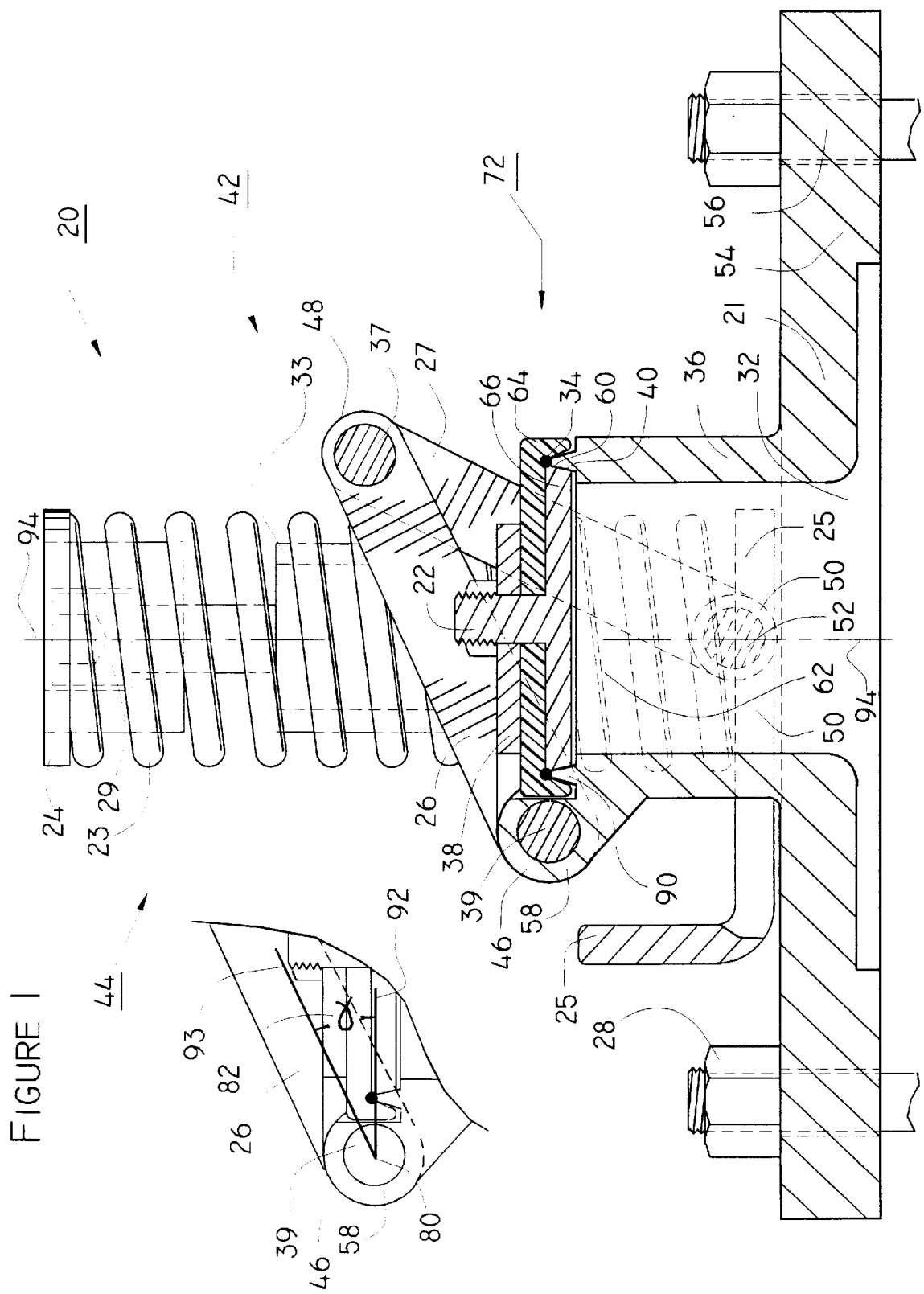
FIG. 1 is a cross-sectional elevational view of the pressure relief valve taken along line 1—1 of FIG. 2.

"Valve" and "flap valve" are used interchangeably in this patent application. "Set Pressure" or "Set Force"=the initial pressure or force required to just open the valve from the closed position. Also referred to as the "valve opening force" or "valve opening pressure" required to overcome the set pressure. Also referred to as the cracking pressure or force.

Referring to FIGS. 1 through 5 the present invention a pressure relief valve is shown generally as 20. The main features of pressure relief valve 20 are a valve body 21, valve 22, valve seat 40 and a valve actuation means shown generally as 42. Valve 22 is also known in the art as a swing type safety valve, or a flap valve. Valve body 21 preferably includes a mounting flange 54, mounting studs 56, and securement nuts 28 for mounting onto a pressure vessel not shown.

Valve actuation means 42 includes link arm 27, pivot arm 26 and biasing means shown generally as 44. Pivot arm 26 is pivotally connected at valve end 46 to shaft 39 and is rigidly connected at valve end 46 to valve mount 38. Pivot arm 26 is pivotally connected at pivot end 48 to link arm 27 with a link pin 37. Link arm 27 is pivotally connected at spring end 50 to spring stop 25 with connecting pin 52. Biasing means 44 includes springs 23, spring axis 94, spring caps 24, retainer bolt 29, spring guide 33, and spring stop 25.

Figure 2:
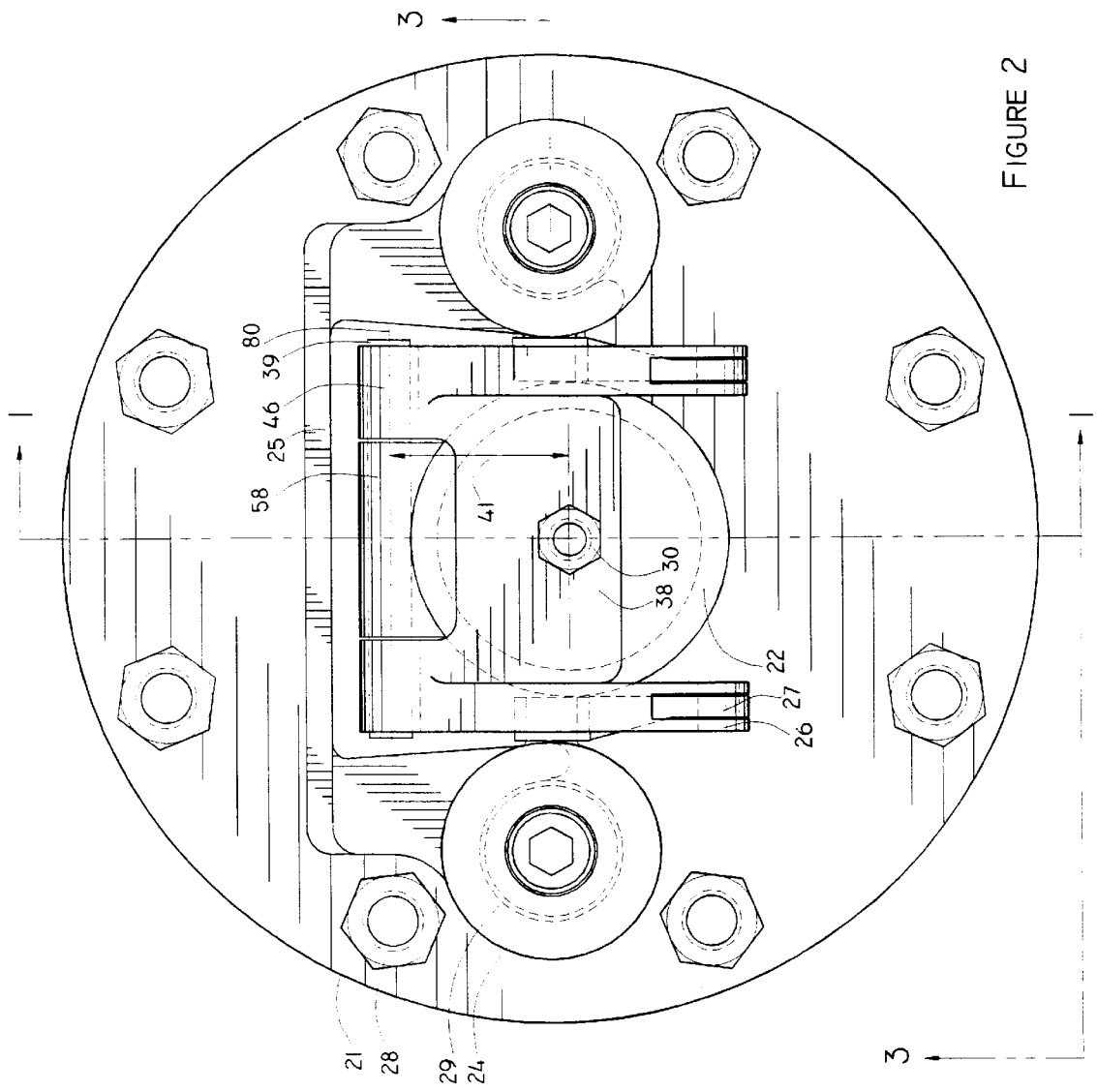
FIG. 2 is a top view looking down from above onto the pressure relief valve shown in FIG. 1.

Valve body 21 includes a cylindrically shaped valve nozzle 36, a valve seat 40 a shaft housing 58, and shaft 39 which is securely attached to shaft housing 58 as best viewed in FIG. 2. Valve seat 40 is preferably circular in shape when viewed from the top as in FIG. 2, and has wedge shaped upper surfaces 60 best shown in FIG. 5 which make contact with valve 22.

Valve nozzle 36 defines a cylindrical flow channel 32 for directing the flow of liquid or gas out through valve opening 62, when valve 22 is open.

Valve 22 is rigidly fixed to valve mount 38 with jam nut 30. Valve mount 38 is integrally and rigidly connected to pivot arm 26. The longitudinal axis of 93 of pivot arm 26 is disposed at a preselected angle alpha 82 relative to valve plane 92 as show in FIG. 1.

Valve 22 preferably includes two sections namely an outer valve disk 64 and an inner valve disk 66. Outer valve disk 64 includes an outer sealing surface 68 adapted to co-operate with and seal against upper surfaces 60 of valve seat 40. Similarly inner valve disk 66 includes an inner sealing surface 70 adapted to co-operate with and seal against upper surfaces 60 of valve seat 40.

Outer and inner sealing surfaces 68 and 70 form a female inverted V shaped circular groove 90 which mates with and sealingly co-operates with a male wedge inverted V shaped upper surfaces 60. In order to assure a good seal, an o-ring 34 is located at the base of the inverted V shaped groove 90 defined by outer and inner sealing surfaces 68 and 70. Upper surfaces 60 have a flat top surface mating against o-ring 34 when valve 22 is in the closed position as depicted in FIG. 1 and 5.

Manufacturing valve 22 in two pieces namely with inner valve disk 66 and outer valve disk 64, facilitates quick replacement of o-ring 34. In addition the wedge shaped upper surfaces 60 co-operating and sealing against outer and inner sealing surfaces 68 and 70 ensures a seal even if o-ring 34 should fail.

Figure 3:
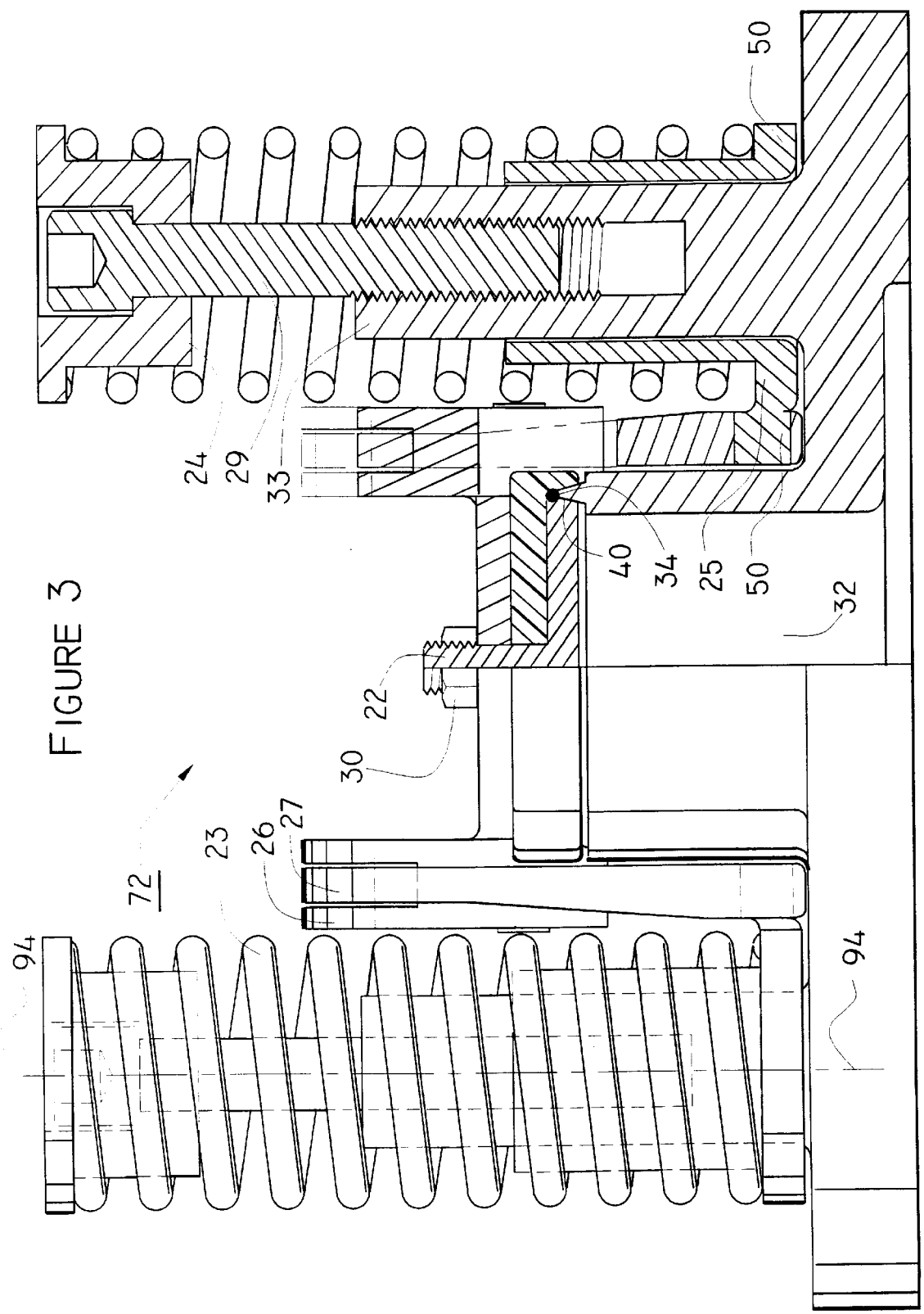
FIG. 3 is a cross-sectional elevational view of the pressure relief valve taken along lines 3—3 of FIG. 2.
Figure 4:
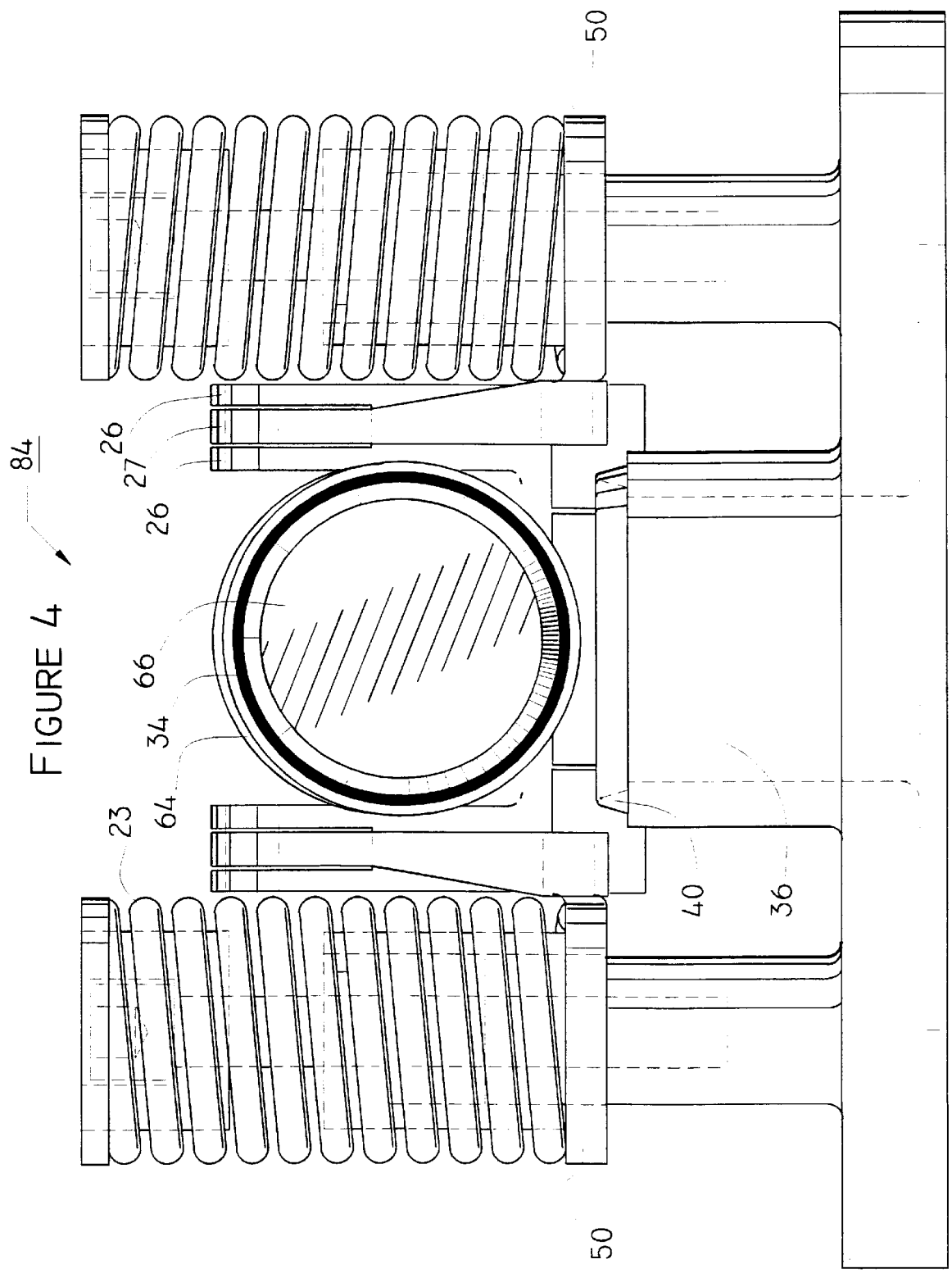
FIG. 4 is a side elevational view of the pressure relief valve showing the valve in the open position.

FIGS. 1 to 3 show pressure relief valve 20 in a closed position 72. Forces acting on valve 22 due to pressurized liquids or gases within flow channel 32 tend to urge valve 22 off valve seat 40 thereby breaking the seal between valve 22 and valve seat 40 and allowing the pressurized contents to flow within flow channel 32 through valve nozzle 36 and out past valve opening 62 and valve 22. This is known as the cracking pressure or the valve opening force required to overcome the set pressure. FIGS. 4 and 5 show pressure relief valve 20 in a fully open position 84.

Figure 5:
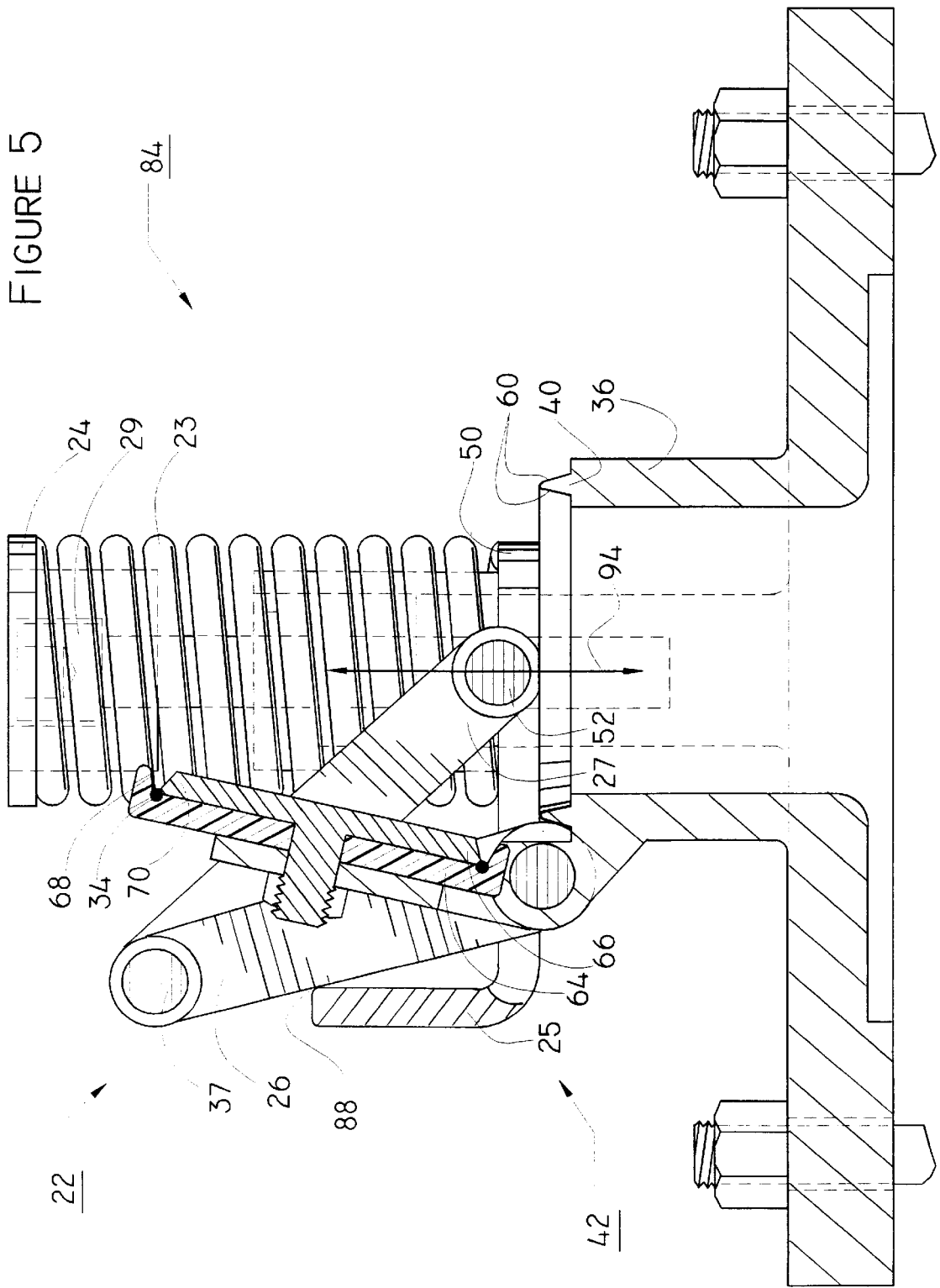
FIG. 5 is a cross-sectional elevational view of the pressure relief valve showing the valve in the fully open position.

Valve 22 pivots about shaft 39 and is free to move from the closed position 72 to the fully opened position 84 which is about 80° relative the closed position 72 as depicted in FIGS. 4 and 5. Valve 22 is designed to swing or rotate open 80° about pivot axis 80 to where pivot arm 26 contacts spring stop 25 at stop 88 as best show in FIG. 5. Contacting stop 88 prevents further opening of valve 22. In principle valve 22 could open past 80°, however in practice opening valve 22 past 80° may result in undesirable flutter and other practical problems known in the art.

The number of springs 23 is preferably two, however, the valve will also function with only one or other number of springs 23. When two or more springs are utilized spring stop 25 connects springs 23 such that the springs are arranged in parallel and the total spring force available is the sum of the spring forces from each spring.

Valve 22 pivots about pivot axis 80 which runs longitudinally through shaft 39. The distance between pivot axis 80 and the centre of valve 22 is shown as offset distance 41. The angle between pivot arm 26 and valve plane 92 is shown as angle alpha 82. Angle alpha 82 is preselected and remains constant during the opening of valve 22 and is one of the factors chosen to yield the desired valve opening force characteristics as valve 22 moves from closed position 72 to open position 74 and finally to fully open position 84. Spring stop 25 functions to retain spring 23 between spring caps 24 on the top and spring stop 25 on the bottom. Spring stop 25 also functions to transmit the forces of both springs that are depicted in FIGS. 1 and 2 to each other and also to valve mount 38 in order to evenly distribute the closing forces on valve 22 transmitted from springs 23. Therefore, spring stop 25 not only functions to retain springs 23 at the bottom end but also to ensure that there is uniform loading on valve mount 38 which pivots about shaft 39 when valve 22 moves between an open position 74 and closed position 72.

The set force is the initial force on valve 22 and is adjusted by pre-compressing springs 23 to the desired level by tightening retainer bolts 29. Only a predetermined component of the set force is transmitted as a valve closing force on valve 22. The component of set force transmitted to valve 22 is influenced by the lengths chosen for link arm 27 and pivot arm 26 the offset 41, the angle alpha 82 and the location of spring axis 94. Therefore, the opening set pressure or set force of pressure relief valve 20 can be varied greatly to accommodate many different operating conditions and environments.

Figure 18:
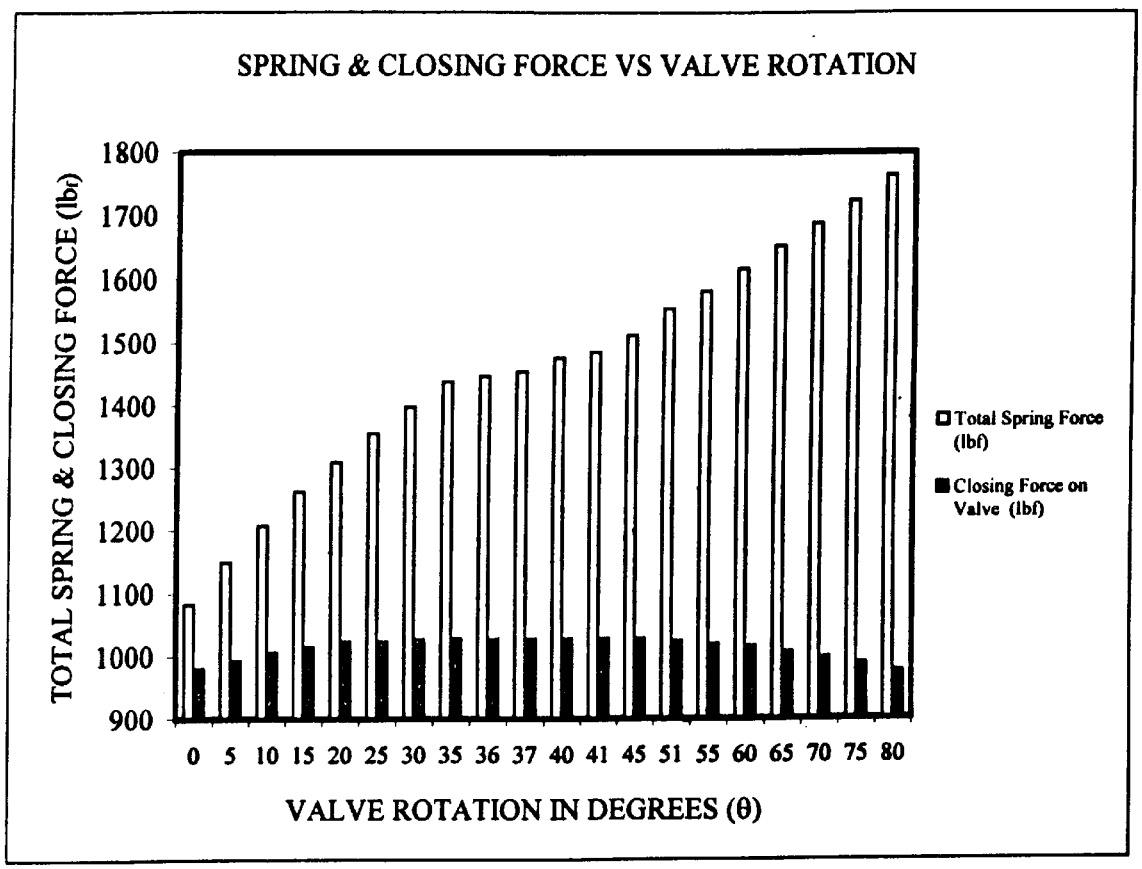
FIG. 18 is a graph showing Spring and Closing Force versus Valve Rotation in degrees. This Figure shows graphically how the closing force on the valve varies as a function of opening degrees as well as the total spring force imparted by the biasing means as a function of the valve rotation and degree. This is also referred to in the description as the valve closing force profile.

In some operating environments it is desirable to have a valve closing force that initially increases as valve 22 moves from closed position 72 to an open position 74 in order to avoid a false opening. Subsequently it may be desirable the valve closing force decreases as valve 22 opens further until valve 22 has reached the fully open position 84. The example below in fact has such a valve closing force profile. A valve closing force profile is depicted in FIG. 18. It is the closing force on the valve as a function of the valve position (in this case rotation).

Figure 6:
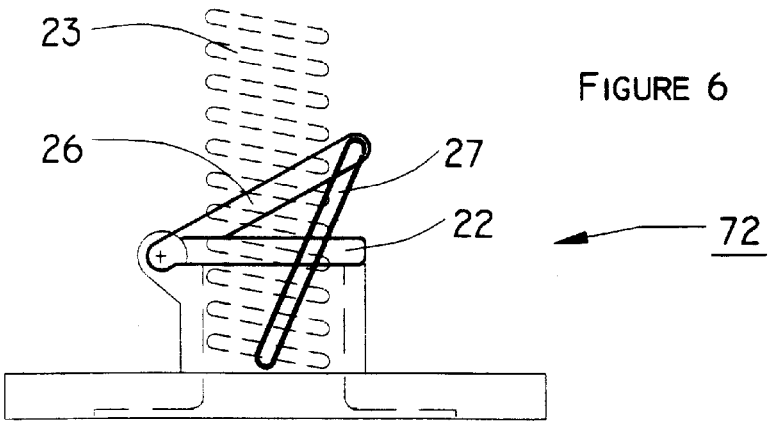
FIG. 6 is a schematic view of the pressure relief valve using a coil spring showing the valve in the fully closed position.
Figure 7:
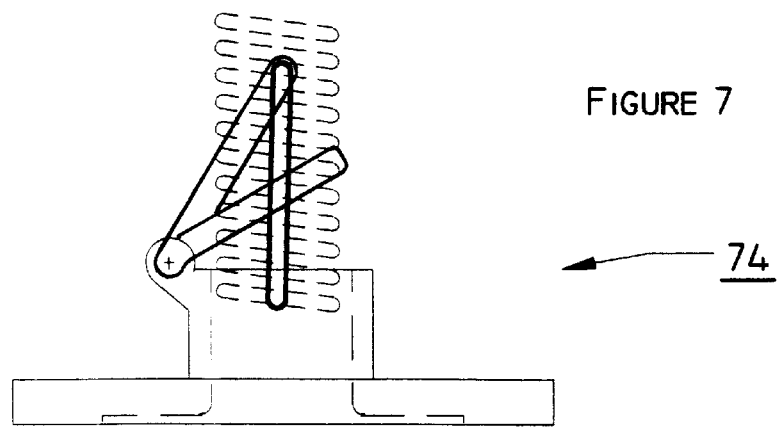
FIG. 7 is a schematic view of the pressure relief valve using a coil spring showing the valve in the 30° open position.
Figure 8:
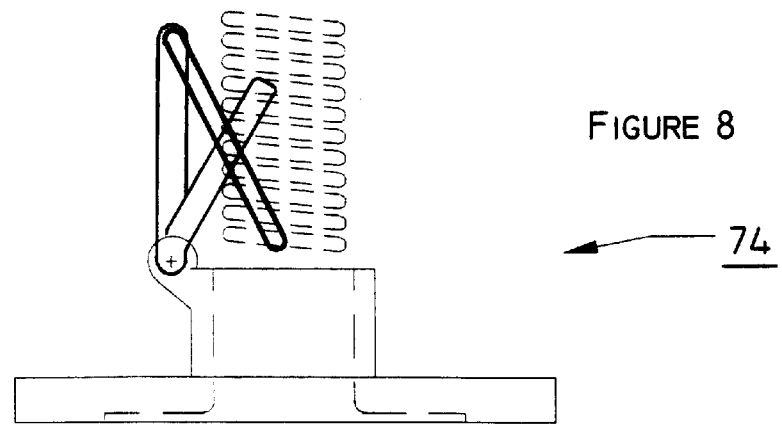
FIG. 8 is a schematic view of the pressure relief valve using a coil spring showing the valve in the 60° open position.
Figure 9:
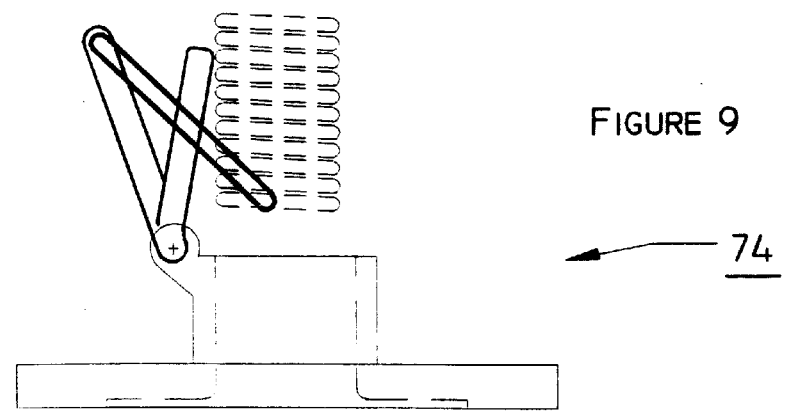
FIG. 9 is a schematic view of the pressure relief valve using a coil spring showing the valve in the fully open 80° position.

Referring now to FIGS. 6 to 9 which are schematics of the pressure relief valve 20 showing the major components of valve actuation means 42 namely: valve 22, pivot arm 26, spring 23 and link arm 27 at various positions including the closed position 72 in FIG. 6 and progressively more open positions 74 in FIGS. 7, 8 and finally the fully open position 84 in FIG. 9 respectively.

Figure 10:
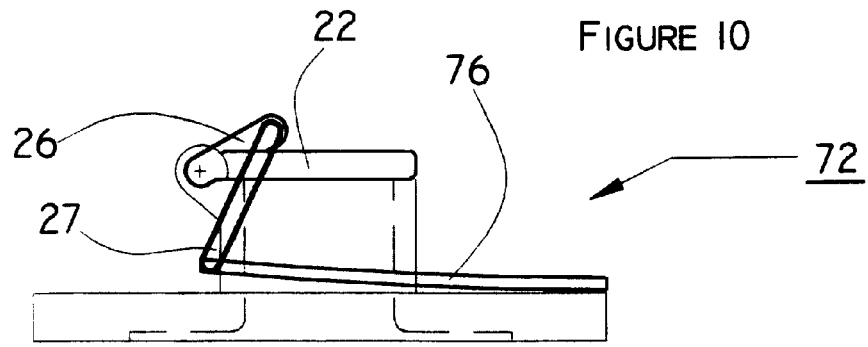
FIG. 10 is a pressure relief valve using a cantilever for biasing means with the valve in a fully closed position.
Figure 11:
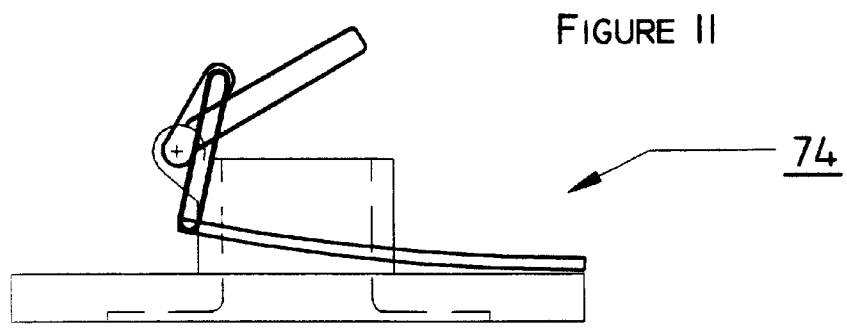
FIG. 11 is a pressure relief valve using a cantilever for biasing means with the valve in the 30° open position.
Figure 12:
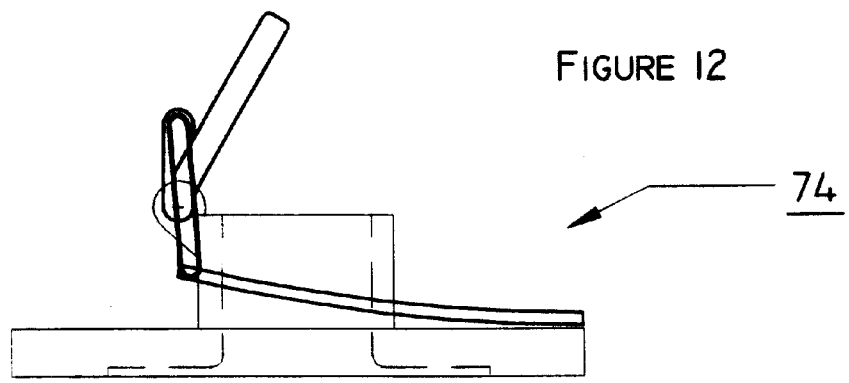
FIG. 12 is a pressure relief valve using a cantilever for biasing means with the valve in the 60° open position.
Figure 13:
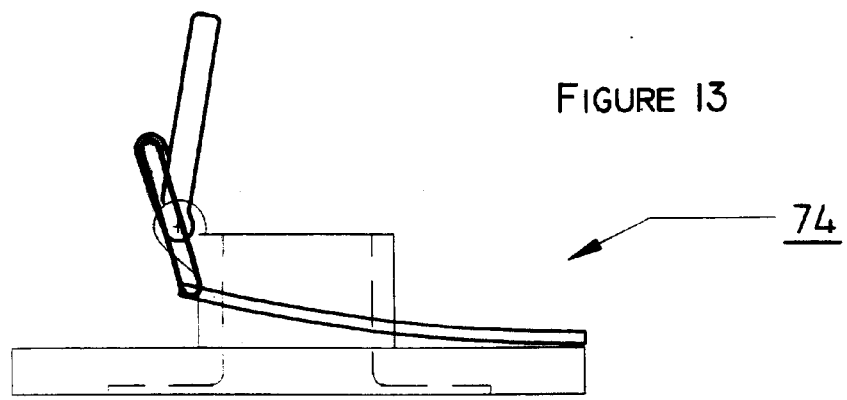
FIG. 13 is a pressure relief valve using a cantilever for biasing means with the valve in the fully open position.

FIGS. 10 to 13 show an alternative embodiment of pressure relieve valve 20 in which spring 23 is substituted with a cantilever 76. FIG. 10 depicts valve 22 in the closed position, whereas FIGS. 11, 12 show progressively more open positions 74 and finally in the fully open position 84 in FIG. 13.

Figure 14:
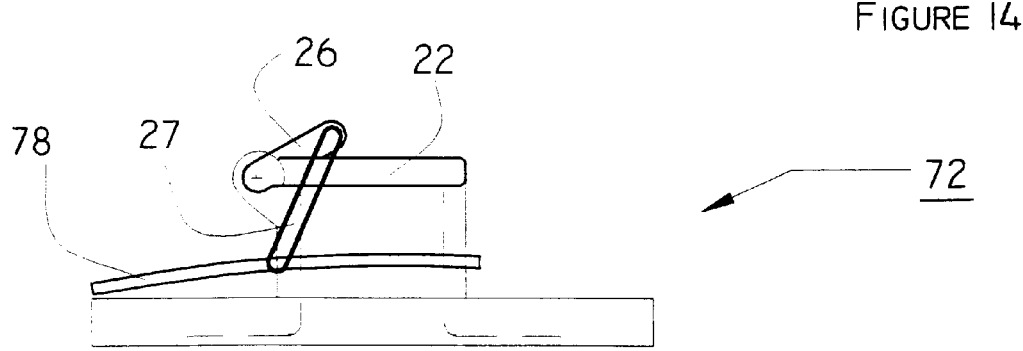
FIG. 14 is a side schematic elevational view of the valve using a leaf spring as a biasing means showing the valve in the closed position.
Figure 15:
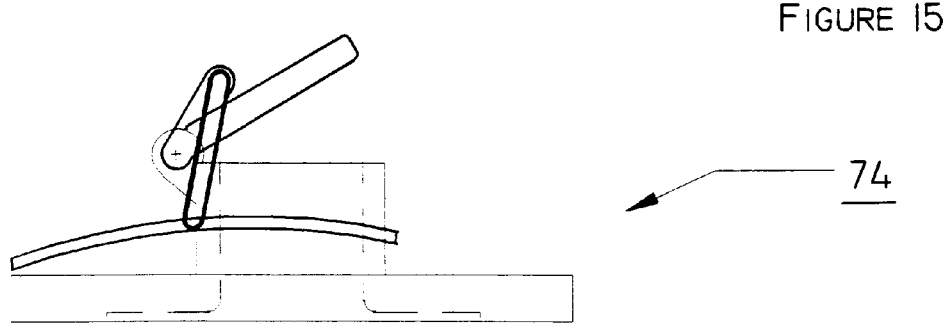
FIG. 15 is a side schematic elevational view of the valve using a leaf spring as a biasing means showing the valve in the 30° open position.
Figure 16:
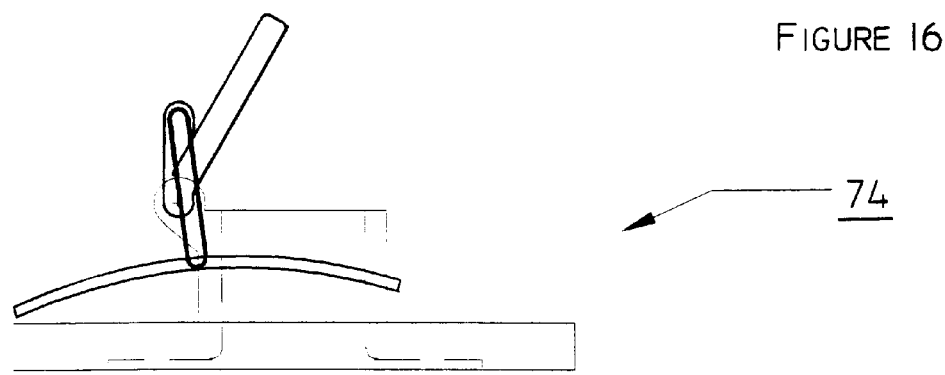
FIG. 16 is a side schematic elevational view of the valve using a leaf spring as a biasing means showing the valve in the 60° open position.
Figure 17:
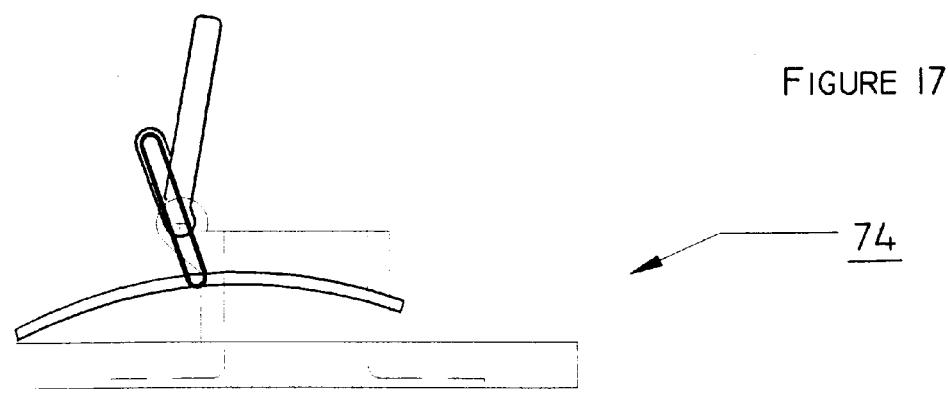
FIG. 17 is a side schematic elevational view of the valve using a leaf spring as a biasing means showing the valve in the fully open position.

Similarly FIGS. 14 to 17 show yet another alternative embodiment of pressure relief valve 20 in which spring 23 is substituted with a leaf spring 78. FIG. 14 shows valve 22 in the closed position, whereas FIGS. 15, 16 show progressively more open positions 74 respectively, and finally in the fully open position 84 in FIG. 17.

In use pressure relief valve 20 functions as follows. The parts heretofore described are assembled as depicted in the attached drawings and springs 23 are compressed by threadably tightening retainer bolts 29, which urges spring caps 24 downwardly which in turn pre-compresses springs 23, and transmits a pre-set spring force onto spring stop 25 (also known as the set force).

A component of the force on spring stops 25 is transmitted to valve 22 through link arm 27, pivot arm 26 and valve mount 38. The closing force of valve 22 upon valve seat 40 is a function of the force imparted by the pre-set spring force of springs 23, the length of link arm 27 and pivot arm 26, the angle alpha 82, the location of spring axis 94, and the offset distance 41 among others. By selecting different combinations of the above mentioned variables, the valve closing force as a function of valve rotation (ie the valve closing force profile) can be tailored to suit a specific application. The present geometry allows one to use one spring size for a variety of different pressure relief valve applications requiring different set forces and/or valve closing force profiles.

The following is an example of a possible valve configuration and the valve closing force profile that it yields. These values are derived from mathematical modelling of the valve geometry and forces:

Link arm length=4.47"

Pivot arm length=4.25"

Spring rate=150 lbf/inch

Number of springs=2

Offset distance=2"

| VALVE ROTATION IN DEGREES (Theta) | TOTAL SPRING FORCE (lb$_f$) | CLOSING FORCE ON VALVE (lb$_f$) |
|---|---|---|
| 0 | 1082 | 982 |
| 5 | 1148 | 995 |
| 10 | 1208 | 1007 |
| 15 | 1262 | 1016 |
| 20 | 1310 | 1024 |
| 25 | 1356 | 1024 |
| 30 | 1398 | 1029 |
| 35 | 1438 | 1029 |
| 36 | 1446 | 1029 |
| 37 | 1454 | 1029 |
| 40 | 1476 | 1029 |
| 41 | 1484 | 1029 |
| 45 | 1512 | 1029 |
| 51 | 1554 | 1024 |
| 55 | 1582 | 1020 |
| 60 | 1616 | 1016 |
| 65 | 1652 | 1007 |
| 70 | 1688 | 999 |
| 75 | 1724 | 990 |
| 80 | 1764 | 978 |

One can see from the above data that valve 22 pivots on pivot axis 80 from a closed position at theta=0° to a fully open position 84 where theta=80°. The initial pressure on valve 22 is set by pre compressing each spring 23 to a level of approximately 542 pounds force by tightening retainer bolts 29. Therefore the total set force available at spring stop 25 is approximately 1082 pounds force when valve 22 is in closed position 72. The springs compress at a rate of 150 pounds force per inch to obtain a maximum closing force component on valve 22 of roughly 1029 pounds force between approximately 30° and 45°. Between 45° and 80° valve 22 continues to open, however, the closing force on valve 22 decreases to approximately 978 pounds force when valve 22 is at a fully opening position 84 of theta=80°. From theta=0° to theta=80° the springs 23 are compressed a total of approximately 2.3".

The data presented above is depicted in graph form in FIG. 18. One can see that the spring force in pounds force increases from 1,082 at theta=to 0° all the way up to 1,764 pounds force at theta=to 80°. At the same time, the closing force on valve 22 increases from 982 pound force at theta=0° to a maximum of 1,029 pounds at theta=30° then remains relatively constant until theta=45° and than the valve closing force decreases back to 978 pounds force at theta=80°. It is apparent that the total spring force constantly increases as the valve is rotated between 0° and 80°, whereas the closing force on valve 22 is not proportional to the total spring force but rather a preselected component of the total spring force.

From this example, one can see that the closing force on valve 22 can be manipulated so that initially the force increases as valve 22 opens and then subsequently decreases as valve 22 opens further even though the force imparted by springs 23 continuously increases from approximately 1082 pounds force at theta=0° position to 1764 pounds force at theta=80° position.

It will be apparent to those skilled in the art that one advantage of the present mechanical arrangement is that the valve opening force is not necessarily follow the total spring force and in fact, the total spring force in the example given herein increases with valve rotation when in fact the closing force on valve 22 is decreasing.

It will also be apparent to those skilled in the art that using the present invention, a number of other valve closing force profiles are possible other than the one given in this example. By way of example only and not limiting the possibilities of the valve closing force profiles that can possible be achieved, the closing force on valve 22 may in fact increase firstly, and then decrease below the preset level so that the valve closing force at the fully open position, theta=80° will be less than the valve closing force at the closed position, theta=0°.

Another possibility is that the valve closing force may remain relatively uniform from valve rotation theta=0° to theta=80°. Yet another possibility is that the valve closing force profile may in fact continue to increase as the valve rotation increases from theta=0° to theta=80°. In addition, any combination of the above is possible with the closing force on valve 22 increasing and decreasing as a function of the valve rotation in degrees theta. Therefore, it will be apparent that the valve closing force profile can be selected to achieve the valve closing profile and valve performance required for any particular application by varying the various valve parameters as discussed above.

The major parameters that can be altered to vary the performance of the pressure relief valve are: spring 23 (number, size and constant) the length of pivot arm 26 and link arm 27, the angle alpha 82 (shown in FIG. 1) the distance from pivot axis 80 to centre of valve 22 shown in FIG. 2 as offset 41, and the location of spring axis 94. Therefore, slight functional variations of pressure relief valve 20 can be achieved by varying the abovementioned parameters.

For example it will be apparent to those skilled in the art of designing and manufacturing pressure relief valves that when using this design, identical springs can be used for producing a variety of pressure relief valves having different set forces and valve closing force profiles. Therefore, this allows one great flexibility to stream line and reduce the number of parts that are required in order to produce valves having different capacities and sizes without having to have on hand large numbers of springs of different sizes and with different spring constants.

In the example given above, the total undeflected spring length is approximately 11.2" and the set deflection of spring 23 is roughly 3.6". Spring 23 compresses an additional 2.3" during opening of valve 22. Therefore, at fully open position 84, spring 23 deflects or compresses a total of about 5.9". By utilizing this geometry the total size of the pressure relief valve is reduced, the absolute size of the spring is reduced and the amount of head clearance required in order to accommodate the height of the pressure relief valve is also reduced significantly when compared to a conventional poppet valve.

It should be apparent to persons skilled in the arts that various modifications and adaptation of this structure described above are possible without departure from the spirit of the invention the scope of which defined in the appended claims.

I claim:

1. A pressure relief valve comprising:
   (a) a valve body including a valve seat;
   (b) a flap valve pivotally mounted on said valve body, said flap valve sealingly co-operating with said valve seat in a closed position sealing off said pressure relief valve, said flap valve pivoting about a pivot axis between said closed position and a fully open position;
   (c) a biasing means operably connected to said flap valve for applying a biasing force as said valve pivots from said closed position to said fully open position; and
   (d) a linkage means for communicating biasing force from said biasing means to said valve such that the linkage means continuously urges said valve to said closed position, said linkage means communicating a preselected component of said total biasing force onto said valve as a closing force, wherein the linkage means is adapted to enable the valve closing force to be preselected according to the position of the flap valve, such that the valve closing force as a function of the valve position can be pre selectively controlled,
   wherein said linkage means comprises:
   (e) a pivot arm having a valve end and a pivot end, said valve end rigidly and integrally connected to said flap valve and extending longitudinally from said pivot axis, wherein said pivot arm pivots above said pivot axis in unison with said valve, and wherein said pivot arm is longitudinally disposed at a preselected angle alpha from a valve plane; and,
   (f) a link arm having a pivot end and a spring end, said link arm and pivot arm pivotally connected together at said pivot end of each arm, and said link arm pivotally connected to said biasing means at said spring end, wherein said spring end of said link aim is urged linearly along a spring axis by said biasing means, and said link arm pivotally connected to said pivot arm communicates and converts said linear movement of said end of said link arm into a pivoting movement of said pivot arm about said pivot axis, wherein only a preselected component of the total bias force is communicated as a valve closing force to said flap valve.

2. The pressure relief valve claimed in claim 1, wherein said biasing means includes a coil spring securely mounted longitudinally along said spring axis in compression between a spring cap at one end and a spring stop at the other spring end, wherein said spring stop and said spring end of said link arm are pivotally connected together for communicating spring forces from said spring to said valve.

3. The pressure relief valve claimed in claim 2, wherein said biasing means further includes a retainer bolt mounted longitudinally along said spring axis which threadably engages a spring guide integrally part of said valve body, such that said coil spring can be pre compressed to provide a preselected set pressure by threadably tightening said retainer bolt thereby compressing said spring between said spring cap and said spring stop, and wherein spring movement is guided linearly along said spring guide which extends longitudinally along said spring axis and part way along the longitudinal length of said spring.

4. The pressure relief valve claimed in claim 3, wherein said pressure relief valve includes at least, two substantially identical pivot arms, link arms and springs, each mounted as described above in symmetrical fashion about said valve, wherein further said springs are operably connected in parallel fashion by said spring stop such that the total biasing force available is the sum of the forces from each spring.

5. The pressure relief valve claimed in claim 4, wherein said valve seat includes inverted V shaped upper surfaces for sealing against a V shaped groove in said valve which is adapted to cooperate and seal with said V shaped upper surfaces of said valve seat, when said V shaped upper surfaces make contact with said V shaped groove.

6. The pressure relief valve claimed in claim 5, wherein said valve includes an inner valve disk and an outer valve disk, with respective planar surfaces lying parallel and abutting each other, such that the inner valve disk defines a inner sealing surface and the outer valve disk defines an outer sealing surface wherein inner and outer sealing surfaces together form said V shaped groove which cooperates and seals against said upper surfaces of said valve seat.

7. The pressure relief valve claimed in claim 6, wherein said valve includes an o-ring disposed between said inner sealing surface and said outer sealing surface at the base of said V shaped groove, such that said upper surfaces of said valve seat contact said o-ring when said valve is in said closed position thereby providing a fluid tight seal.

8. The pressure relief valve claimed in claim 7, wherein the fully open position is attained by pivoting said flap valve 80° from said closed position, and wherein a stop prevents rotation of said valve past 80°.

9. The pressure relief valve claimed in claim 8, wherein said pivot axis location, angle alpha, link arm length, pivot arm length and the location of said spring axis are selected such that said valve closing force remains substantially constant as the valve pivots from said closed position to said fully open position.

10. The pressure relief valve claimed in claim 8, wherein said pivot axis location, angle alpha, link arm length, pivot arm length and the location of said spring axis are selected such that said valve closing force initially increases, to prevent a false opening of the valve, then remains substantially constant for most of the valve rotation, and then decreases as the valve pivots from said closed position to said fully open position respectively.

11. The pressure relief valve claimed in claim 1, wherein said pivot axis location, angle alpha, link arm length, pivot arm length and the location of said spring axis are selected such that said valve closing force initially increases, to prevent a false opening of the valve, then remains substantially constant for most of the valve rotation, and then decreases as the valve pivots from said closed position to said fully open position respectively.

12. The pressure relief valve claimed in claim 1, wherein said pivot axis location, angle alpha, link arm length, pivot arm length and the location of said spring axis are selected such that said valve closing force remains substantially constant as the valve pivots from said closed position to said fully open position.

13. The pressure relief valve claimed in claim 1, wherein said pivot axis location, angle alpha, link arm length, pivot arm length and the location of said spring axis are selected such that said valve closing force remains within ±5% of the valve opening force as the valve pivots from said closed position to said fully open position.

14. The pressure relief valve claimed in claim 1, wherein said pivot axis location, angle alpha, link arm length, pivot arm length and the location of said spring axis are selected such that said valve closing force continuously increases or decreases as said valve pivots from said closed position to said fully open position.

15. The pressure relief valve claimed in claim 1 wherein said bias means includes a leaf spring.

16. The pressure relief valve claimed in claim 1 wherein said biasing means includes a cantilever.

17. The pressure relief valve claimed in 1 or 9, for use with railway tank cars containing pressurized gases or liquids.

18. The pressure relief valve claimed in claim 1, wherein said biasing force applies a continuously increasing force as said valve pivots from said closed position to said fully open position.

* * * * *